United States Patent [19]
Lawrence

[11] 4,183,328
[45] Jan. 15, 1980

[54] APPLICATOR AND CONTAINER ASSEMBLY FOR APPLYING LIQUID COMPOSITIONS TO PET ANIMALS AND THE LIKE

[75] Inventor: Frank S. Lawrence, Adamstown, Md.

[73] Assignee: Pet Aids Ltd., Inc., Leesburg, Va.

[21] Appl. No.: 908,444

[22] Filed: May 22, 1978

[51] Int. Cl.² .............................................. A01K 13/00
[52] U.S. Cl. .................................... 119/156; 128/269; 132/112
[58] Field of Search .......................... 119/156, 83, 86; 128/269; 401/198, 199; 222/186, 78; 132/112, 88.7, 88.5

[56] References Cited

U.S. PATENT DOCUMENTS

| 1,829,021 | 10/1931 | Sinclair | 119/86 X |
| 2,943,602 | 7/1960 | Rundle | 119/156 |
| 3,369,543 | 2/1968 | Ronco | 128/269 |

Primary Examiner—Hugh R. Chamblee
Attorney, Agent, or Firm—Mason, Fenwick & Lawrence

[57] ABSTRACT

A dispenser applicator and flexible walled container assembly for applying liquid compositions such as anti-tick and anti-flea compositions and the like to the skin of pet animals, including an applicator portion molded in the configuration of the kind of pet animal to be treated having hollow legs resembling the pet animal's legs forming coarse combing members to spread the animal's hair into furrows. The hollow legs form tubular conduits for the liquid composition and have elongated felt pad members protruding from the lower ends to contact the animal's skin and transfer the liquid composition thereto. The flexible walled container comprising an elongated generally round cross-sectioned squeeze bottle threaded to a tail portion of the applicator and forming a handle for the assembly.

5 Claims, 8 Drawing Figures

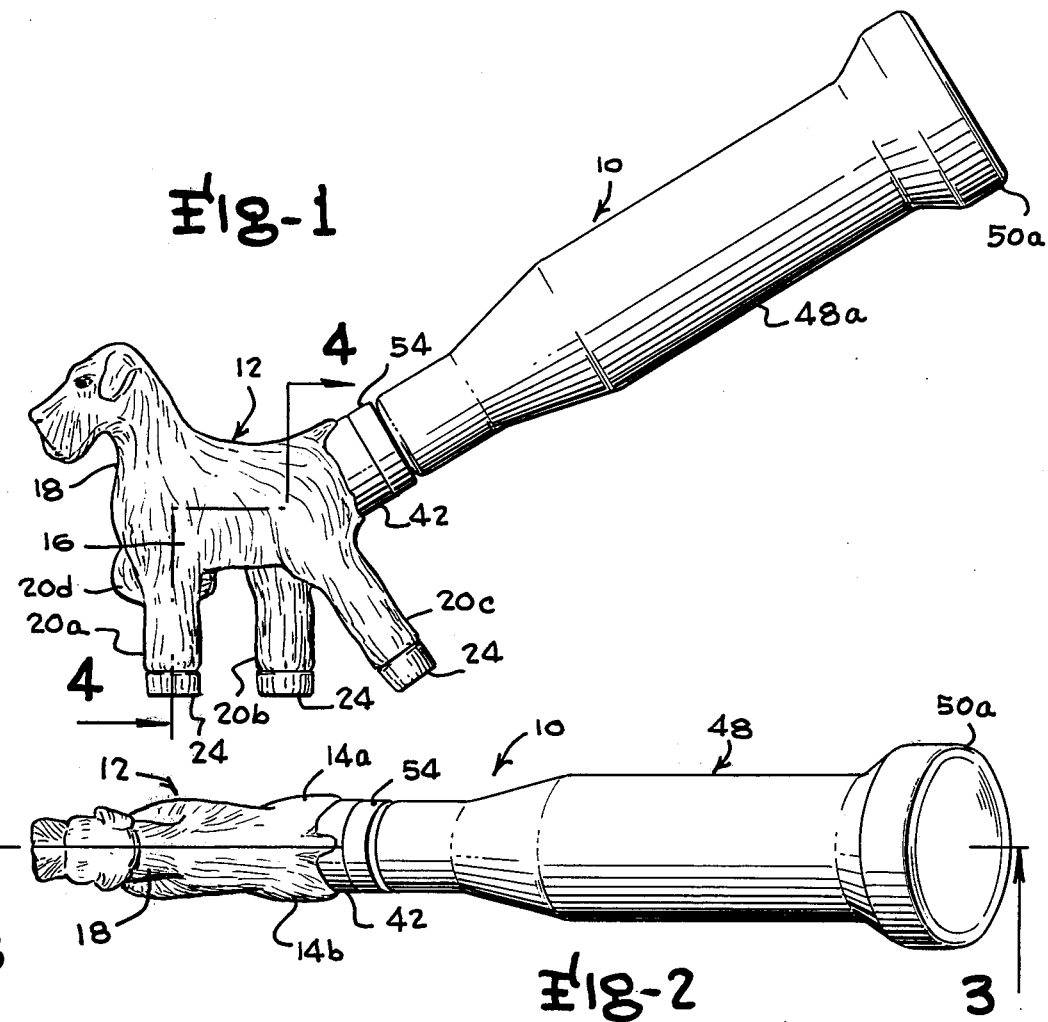
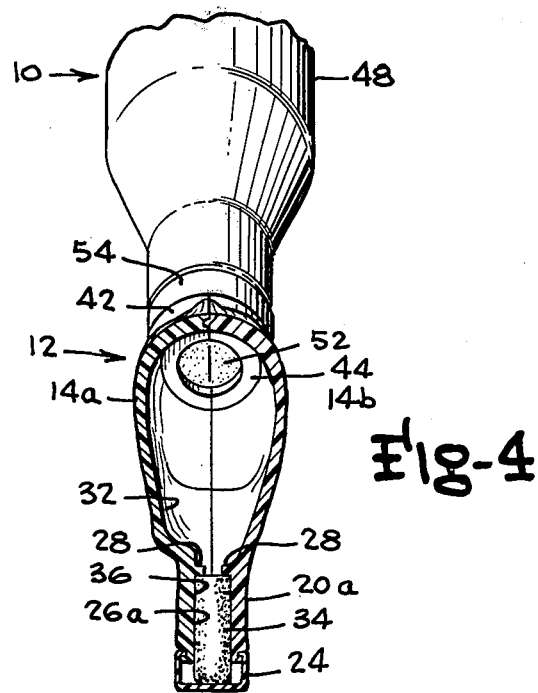

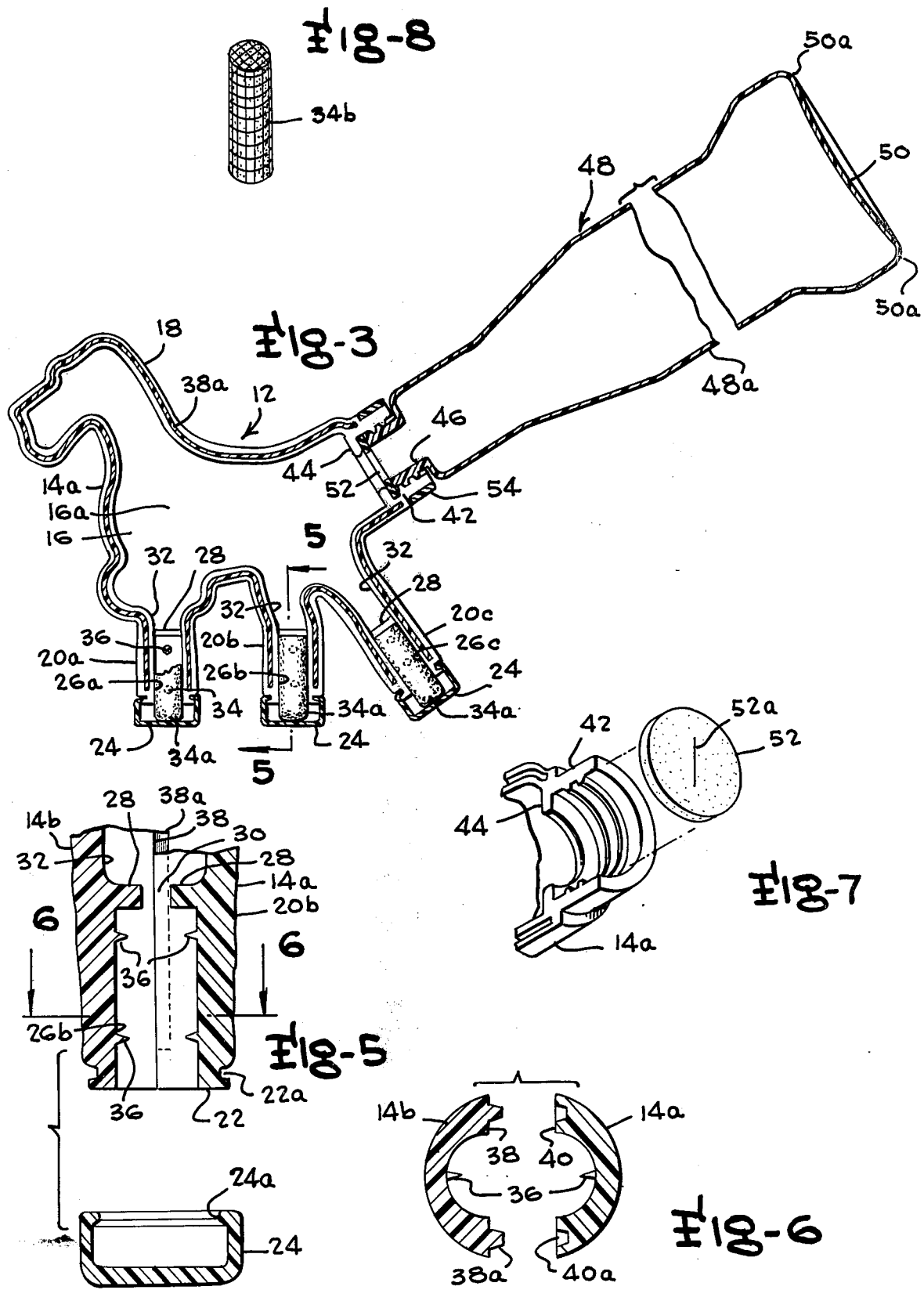

APPLICATOR AND CONTAINER ASSEMBLY FOR APPLYING LIQUID COMPOSITIONS TO PET ANIMALS AND THE LIKE

BACKGROUND AND OBJECTS OF THE INVENTION

The present invention relates in general to liquid composition applicators for applying liquid pest-retardant compositions to the skin of pet animals, and more particularly to dispenser applicator devices including a squeeze bottle type container for applying anti-tick and anti-flea liquid compositions and the like to the skin of pet animals such as dogs and cats.

Heretofore, various flexible containers such as squeeze tubes or squeeze dispenser bottle devices have been provided to discharge liquid or relatively viscous flowable compositions onto various surfaces in desired amounts. While these flexible walled containers or tubes have come into wide use as a means of packaging many varieties of flowable materials, they share a number of problems, relating to their tendency to cause spurting or uneven discharge of the flowable material onto the deposit surface, wastage because of inability to discharge all of the contents, and the like. The usual configuration of the discharge orifice portion of such devices does not lend itself well to effective and efficient application of the flowable contents to the skin or hairy pet animals such as dogs and cats, as only a single narrow ribbon-like path or band of skin would receive the discharged material from such squeeze tubes or bottles as the discharge spout or orifice portion is moved along the application path between parted rows of hair or fur.

Hair and scalp treating comb-like devices have been used with rigid or squeeze type liquid reservoirs to apply medicament compositions directly to the human scalp but these usually involve the mere use of a comb having hollow teeth with open discharge orifices or having bristles which form liquid conducting pores communicating with the liquid reservoir to transfer the liquid medicament composition, or hair dye, or the like, to the scalp. However, these devices do not have the desired properties to achieve adequate control and placement of compositions such as anti-tick and anti-flea liquid compositions between the hairs or fur onto the skin of pet animals such as dogs and cats, and to the best of my knowledge, have not been proposed for this use.

An object of the present invention, therefore is the provision of a novel applicator and flexible walled container assembly for applying flowable liquid skin treatment compositions such as anti-tick and anti-flea compositions to the skin of pet animals such as dogs and cats which will apply the skin treatment composition in controlled amounts directly to the skin rather than to the hair.

Another object of the present invention is the provision of a novel skin treatment composition applicator and container assembly as described in the immediately preceding paragraph wherein the applicator has hollow legs extending from a body portion resembling the kind of pet animal to be treated, serving as comb teeth to divide the hair of the pet animal to permit application of the treatment composition directly to the skin by felt or similar absorbent pads at the feet ends of the hollow legs.

Yet another object of the present invention is the provision of an efficient and inexpensive pet skin treatment applicator and container assembly as described in the two preceding paragraphs, wherein an elongated flexible walled container shaped like a round handle provides a squeeze bottle type container communicating by a pressure responsive valve formation with the applicator body and leg portion to supply controlled amounts of the treatment composition to the hollow legs when the handle is squeezed.

Other objects, advantages and capabilities of the present invention will become apparent from the following detailed description, taken in conjunction with the accompanying drawings showing a preferred embodiment of the invention.

BRIEF DESCRIPTION OF THE FIGURES

FIG. 1 is a side elevation view of an applicator and container for pet skin treatment liquid compositions, embodying the present invention;

FIG. 2 is a top plan view thereof;

FIG. 3 is a vertical longitudinal section view taken along the line 3—3 of FIG. 2;

FIG. 4 is a vertical transverse section view, taken along the line 4—4 of FIG. 1;

FIG. 5 is a detail section view to enlarged scale, through a leg of the applicator portion, taken along the lines 5—5 of FIG. 3;

FIG. 6 is a section view taken along the line 6—6 of FIG. 5;

FIG. 7 is an exploded perspective view of the valve and a sectional perspective view of parts of the adjacent applicator neck portions; and FIG. 8 is a perspective view of an alternate form of felt pad member.

DETAILED DESCRIPTION OF A PREFERRED EMBODIMENT

Referring to the drawings, wherein like reference characters designate corresponding parts throughout the several figures, there is illustrated an embodiment of the applicator and container assembly, indicated generally by the reference character 10, constructed in accordance with the present invention, adapted especially for applying flowable liquid compositions such as anti-tick and anti-flea compositions to the skin of a dog, although it will be appreciated that the invention may be used, as previously described, for applying similar flowable liquid compositions to the skin of other species of pet animals such as cats and the like. In the illustrated embodiment, the applicator and container assembly comprises an applicator portion 12 molded in the shape of a dog, formed for example from two mating halves 14a,14b of molded plastic shaped to define the torso or body portion 16 and head and neck portion 18 of the dog and having, in the illustrated embodiment, three legs 20a,20b and 20c extending downwardly from the torso or body portion 16. In the particular dog configuration shown, the fourth leg, indicated at 20d is bent upwardly underneath the body portion 16 in a position resembling the position of one of the dogs front legs when on point.

The three legs 20a, 20b and 20c are hollow, as is the body portion 16, forming, in effect, hollow liquid conducting conduits from the body portion 16 to the lower end or foot portions of the three legs. The foot ends terminate in a slightly smaller diameter end formation 22 having a rounded bead or lip 22a, as best shown in FIG. 5, to permit a cup-shaped vinyl snap-cap 24 having a co-active inwardly extending bead formation 24a extending around the cylindrical side wall of the cup-shaped cap 24 so that a cap 24 can be releasibly snapped onto the beaded snap coupling formation 22 on the lower end of each of the three legs 20a, 20b and 20c.

Each of these legs 20a, 20b and 20c have a generally cylindrical elongated lower hollow bore formation, indicated at 26a, 26b and 26c opening through the lower end 22 of the associated leg and extending upwardly for about three-quarters of an inch to stop shoulder ribs 28 formed in the leg portions of the halves 14a, 14b spaced laterally of each other to provide a passage 30 therebetween for communication of liquid from the upper hollow bore portion 32 of each of the legs. The stop shoulders 28 form an abutment for the upper end portion of an absorbent felt pad member 34, one of which is nested in each of the lower hollow bore portions 26a, 26c of the three legs 20a, 20b and 20c and is of sufficient length to project outwardly beyond the end formation 22 at the lower end of each of these legs for an appropriate distance, for example about ⅛ to ¼" to communicate the anti-tick and/or anti-flea flowable liquid composition from the hollow chamber 16a in the torso or body portion 16 of the applicator and upper bore portions 32 of the legs to the external protruding lower end portions 34a of the felt pad members for application of the liquid composition directly to the skin of the dog or other pet animal. It will be appreciated that the protruding legs will act in a manner similar to very coarse comb teeth when the applicator is drawn through the hair of the dog or pet animal in a position so that the legs tend to separate or comb the hair into furrows or rows, so that the protruding end portions of the felt pad members can directly contact the skin of the dog or pet animal and transfer the flowable liquid composition thereto. The felt pad members 34 in the illustrated embodiment may be securely held in place within the lower cylindrical hollow pore portions 26a, 26b and 26c by providing a plurality of inwardly projecting molded pointed barb formations, such as illustrated at 36, which penetrate laterally into the felt pad members during assembly, when the pad members are positioned in one of the mating halves, such as 14a, and the other mating half 14b is then assembled with the companion mating half 14a. As illustrated particularly in FIG. 6, the contact edge portions 38 and 40 of the two mating halves 14a, 14b extending around the perimeter of the mating halves may be formed as tongue and groove contact edges, for example by providing tongues 38a and grooves 40a to receive the tongues, and suitable solvent or plastic bonding composition may be spread on these interlocking tongue and groove abutment surface portions to securely hold the two companion mating halves 14a, 14b upon assembly.

The rear or tail end portion of the applicator portion 12 configurated in the form of a dog is provided with a threaded connector socket formation 42 providing a rearwardly opening, generally cylindrical socket formation bottomed by a smaller diameter annular shoulder 44 having a central opening communicating with the chamber 16a of the body portion 16 and having internal threads over most of the axial length of the socket formation 42, to receive an externally threaded constricted circular neck 46 of the elongated flexible walled container or bottle 48, formed of a plastic composition such as is customarily used for flexible walled blown squeeze bottles and the like. The container or bottle 48 for the assembly, in the illustrated embodiment, has a generally cylindrical elongated side wall portion 48a extending over about three-quarters of its length from its bottom wall or base 50 to a location near the constricting neck 46, which is of a size suitable to form a convenient handle by which the applicator and container assembly can be held, for example having a diameter of about 1¼ to 1½", and in the illustrated embodiment, has an enlarged diameter heel formation 50a at the transition from the bottom wall 50 to the side wall portion 48 of the container. To prevent undesired loss or seepage of the liquid treatment composition from the bottle or container 48 into the applicator portion 12, a normally closed valve disk 52 is seated against the bottom shoulder 44 of the threaded connector socket formation 42, normally clamped between the shoulder 44 and the confronting adjacent edge of the neck end of the bottom or container. The valve disk 52 is in the form of a circular disk of rubber having a narrow cut or normally closed slit 52a extending diametrically across the center portion of the rubber valve disk 52, which is normally resiliently held closed by the elastic memory of the rubber material forming the valve disk 52, but which parts sufficiently when the valve disk is flexed by the hand of the user squeezing the side wall portions 48a of the bottom 48 to transfer some of the liquid contents of the bottle or container portion 48 into the chamber 16a of the applicator torso or body portion 16 and thus communicate the liquid composition discharge from the bottle through the hollow upper bore portions of the legs into contact with the pad members 34 to be absorbed by the pad members. In the illustrated embodiment, the threaded connector socket formation 42 of the companion mating halves 14a, 14b of the applicator body are reinforced and held in assembled relation by a unitary cylindrical ring 54, for example of the same plastic material as the mating halves 14a, 14b, which is assembled externally about and surrounding the threaded connector socket formation portions 42 and is adhesively bonded in assembled relation to secure and reinforce this portion of the applicator.

The felt pad members 34 in the lower portions of the three legs 20a, 20b and 20c may be round in cross-section, providing a cylindrical pad configuration, or may be of rectangular cross-section and be squeezed to the approximate cross-sectional configuration of the hollow bores 26a, 26b and 26c or the cross-sectional configuration of these bores may be modified to more closely correspond to the rectangular cross-section of the felt members if such rectangular cross-section is used. Also, instead of simply using a felt body of the desired configuration for the felt pad members 34, the felt body may optionally be covered with a plastic or nylon mesh covering, as illustrated at 34b in FIG. 8, which enhances the useful life of the apparatus by reducing the wear or abrading action on the protruding portions of the felt pad members.

It will be appreciated in the case of applicator and container assemblies embodying the present invention designed for use in applying the flowable liquid compositions such as anti-tick and anti-flea compositions to cats may have the applicator portion 12 molded in the form and configuration of a cat, rather than a dog, having a plurality of legs projecting from the body portion in positions similar to those of the dog-like applicator portion herein illustrated, to enhance sales appeal and acceptance by cat owners.

I claim:

1. A dispenser applicator and flexible walled container assembly for applying liquid compositions such as anti-tick and anti-flea compositions and the like to the skin of pet animals, comprising an applicator unit molded in the configuration of the kind of pet animal to be treated and shaped to include a body portion defining a hollow chamber to receive the liquid composition and a plurality of hollow legs resembling the pet animal's legs extending therefrom in liquid communication with the chamber along generally parallel, laterally spaced paths forming coarse combing members to spread the animal's hair into furrows, the hollow legs forming tubular conduits for the liquid composition and having elongated felt pad members fixed in lower foot end portions of the legs in liquid communication with the composition in said chamber and protruding therefrom to contact the animal's skin and transfer the liquid composition thereto, the flexible walled container comprising an elongated generally round cross-sectioned squeeze bottle having a threaded coupling to a tail portion of the applicator unit and a fluid communication passage with the hollow chamber of the applicator unit, the lower foot end portions of the hollow legs having downwardly opening socket cavities shaped in cross-section to conform to the cross-sectional shape of the felt pad members to receive the major portion of the axial length of the pad members therein and having an annular abutment shoulder forming the upper end of the respective socket cavity and providing a center opening for passage of the liquid composition from the hollow chamber to the pad members to be absorbed thereby, and said felt pad member being an elongated felt body sheathed with a nylon mesh sheath.

2. A dispenser applicator and flexible walled container assembly as defined in claim 1, wherein said container is in the form of an elongated deformable wall bottle shape like a round handle of sufficient length to be held in the hand of the user and serve as a squeeze handle for the assembly, and wherein a normally closed pressure responsive valve member is provided in the fluid communication passage from the squeeze bottom to the hollow chamber of the applicator unit to normally resist liquid transfer to the chamber of the applicator unit and to open responsive to squeeze pressure on the bottle for transfer of the liquid composition from the bottle to the applicator chamber.

3. A dispenser applicator and flexible walled container assembly for applying liquid compositions such as anti-tick and anti-flea compositions and the like to the skin of pet animals, comprising an applicator unit molded in the configuration of the kind of pet animal to be treated and shaped to include a body portion defining a hollow chamber to receive the liquid composition and a plurality of hollow legs resembling the pet animal's legs extending therefrom in liquid communication with the chamber along generally parallel, laterally spaced paths forming coarse combing members to spread the animal's hair into furrows, the hollow legs forming tubular conduits for the liquid composition and having elongated felt pad members fixed in lower foot end portions of the legs in liquid communication with the composition in said chamber and protruding therefrom to contact the animal's skin and transfer the liquid composition thereto, the flexible wall container comprising an elongated generally round cross-sectioned squeeze bottle having a threaded coupling to a tail portion of the applicator unit and a fluid communication passage with the hollow chamber of the applicator unit, a normally closed pressure responsive valve member located in the fluid communication passage from the squeeze bottle to the hollow chamber of the applicator unit to normally resist liquid transfer to the chamber of the applicator unit and to open responsive to squeeze pressure on the bottle for transfer of the liquid composition from the bottle to the applicator chamber, said valve member being a flat disk member of resiliently deformable rubber-like material having a diametric slit through the center portion thereof, and said applicator tail portion having an internally threaded socket formation housing said disk and removably receiving a threaded coupling portion of the squeeze bottle thereagainst forming the fluid communication passage with the applicator unit chamber.

4. A dispenser applicator and flexible walled container as defined in claim 3, wherein the lower foot end portions of the hollow legs have downwardly opening socket cavities shaped in cross-section to conform to the cross-sectional shape of the felt pad members to receive the major portion of the axial length of the pad members therein and having an annular abutment shoulder forming the upper end of the respective socket cavity and providing a center opening for passage of the liquid composition from the hollow chamber to the pad members to be asborbed thereby.

5. A dispenser applicator and flexible walled container assembly as defined in claim 4, wherein said container is in the form of an elongated deformable wall bottle shaped like a round handle of sufficient length to be held in the hand of the user and serve as a squeeze handle for the assembly.

* * * * *